United States Patent [19]

Schoubye

[11] Patent Number: 5,132,103
[45] Date of Patent: Jul. 21, 1992

[54] PROCESS FOR THE REMOVAL OF NITROGEN OXIDES FROM OFFGASES FROM TURBINES

[75] Inventor: Peter, Carl S. Schoubye, Horsholm, Denmark

[73] Assignee: Haldor Topsoe A/S, Denmark

[21] Appl. No.: 582,943

[22] PCT Filed: Feb. 5, 1990

[86] PCT No.: PCT/DK90/00030
§ 371 Date: Oct. 10, 1990
§ 102(e) Date: Oct. 10, 1990

[87] PCT Pub. No.: WO90/09228
PCT Pub. Date: Aug. 23, 1990

[30] Foreign Application Priority Data

Feb. 10, 1989 [DK] Denmark ............................ 607/89

[51] Int. Cl.⁵ .................... B01J 8/00; C01B 21/00
[52] U.S. Cl. ................................................ 423/239
[58] Field of Search ............. 423/235, 235 D, 239, 423/239 A

[56] References Cited

U.S. PATENT DOCUMENTS

| | | | |
|---|---|---|---|
| 4,115,516 | 9/1978 | Takami et al. | 423/239 |
| 4,393,031 | 7/1983 | Henke | 423/239 |
| 4,473,536 | 9/1984 | Carberg et al. | 423/235 |
| 4,473,537 | 9/1984 | Ford et al. | 423/235 |

Primary Examiner—Gregory A. Heller
Attorney, Agent, or Firm—Ostrolenk, Faber, Gerb & Soffen

[57] ABSTRACT

Nitrogen oxides can be removed from turbines by a selective catalytic reduction (SCR) with ammonia with greater efficiency than by prior art technique if the ammonia needed for the reduction of the nitrogen oxides is added before the turbine, preferably in a stoichiometric excess compared to the contents of nitrogen oxides in the exhaust gas. One can employ well-known SCR catalysts and advantageously the exhaust gas after the turbine is passed through a layer of SCR catalyst followed by a layer of a combustion catalyst. The latter expediently consists of metal oxides, preferably selected from copper oxide, manganese oxide and chromium oxide, deposited on aluminum oxide, magnesium oxide, silicon oxide or mixtures thereof.

13 Claims, 3 Drawing Sheets

PROCESS FOR THE REMOVAL OF NITROGEN OXIDES FROM OFFGASES FROM TURBINES

FIELD OF THE INVENTION

The present invention relates to a process for the removal of nitrogen oxides ($NO_x$) from offgases from turbines by a selective catalytic reduction (SCR) with ammonia. It is possible to obtain up to 98-99% removal (de$NO_x$) of the nitrogen oxides in the offgases (exhaust gas), e.g. the offgases from the turbo-charger of a Diesel engine, by the SCR with ammonia and at the same time obtain after purification, gas containing less than a few ppm of ammonia.

BRIEF DESCRIPTION OF THE DRAWINGS

In the following the prior art and the invention will be described with reference to the drawings, in which FIG. 1 schematically shows a boiler according to prior art, provided with combustion and SCR catalyst sections.

BACKGROUND OF THE INVENTION

Figure 1:
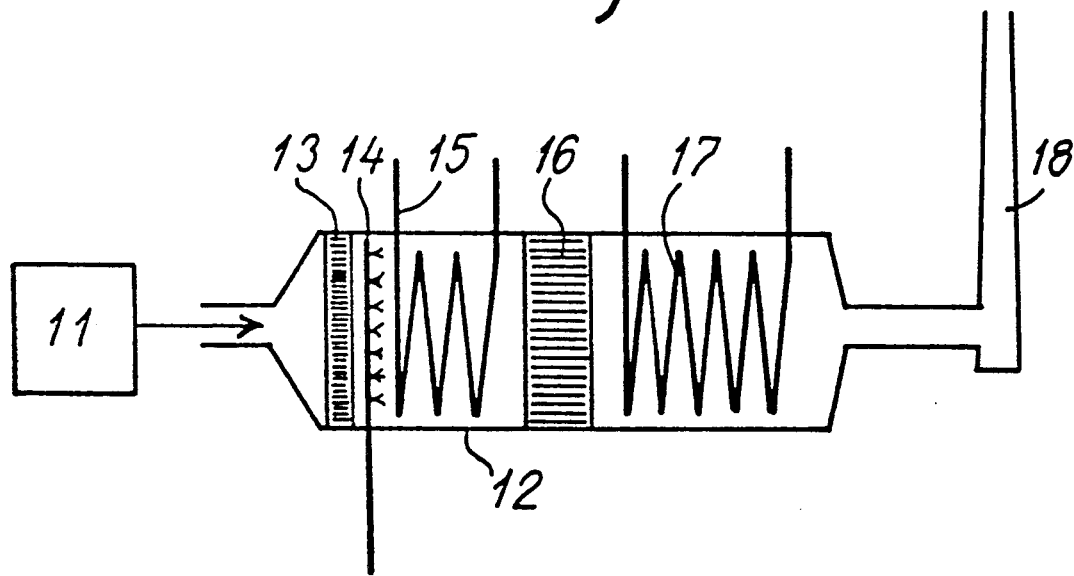

Known processes for the removal of $NO_x$ from offgases from turbines, gas engines and Diesel engines are described in, i.a., the periodical "Power", October 1988, in the article "Reducing $NO_x$ Emissions from Boilers, Gas Turbines end Engines". The most commonly used of these processes is explained with reference to FIG. 1. Here the gas is cooled from a turbine or exhaust turbine 11 in a boiler 12 in which the gas is passed first through a layer of a combustion catalyst 13 for combusting CO and hydrocarbons in the gas, after which ammonia is added to the gas by means of a system consisting of a large number of nozzles 14 distributed over the cross section of the boiler. Subsequently the gas is cooled in a section 15 of the boiler, typically at 340°-380° C., before it is passed through one or more layers or panels of a catalyst 16 catalyzing the SCR reaction:

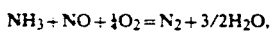

$$NH_3 + NO + \tfrac{1}{4}O_2 = N_2 + 3/2H_2O.$$

whereby the nitrogen oxides, which are almost exclusively present as NO, are removed selectively, i.e. without the ammonia being oxidized by the oxygen present, which is typically between 5% and 16% $O_2$. Thereafter the gas is further cooled down to typically 100° C. in a subsequent boiler section 17 before the gas is passed to a stack 18. Because of an inhomogenous admixture of the ammonia into the gas it is difficult by this process to obtain a degree of purification for $NO_x$ above about 90% if the gas contains more than about 500 ppm of $NO_x$ and if the residual content of $NH_3$, the so-called $NH_3$-slip, must not exceed, e.g., 10 ppm of $NH_3$ after the layer of SCR catalyst.

SCR catalysts are well-known. Frequently they contain as the catalystically active material oxides of vanadium, molybdenum, tungsten, iron ($Fe_2O_3$) or the lanthanides on a carrier of, notably, $TiO_2$ and/or $Al_2O_3$.

An improved admixture of the ammonia may be obtained if the addition takes place in the pipe leading from the turbine to the boiler, which prevents the application of a combustion catalyst before the SCR catalyst; or if the cross sectional area of the flow is narrowed strongly at the point of adding the ammonia according to FIG. 1, which, however, will entail other disadvantages in the form of increased initial expenditure and bulk as well as an increased loss of pressure. Another drawback inherent in this prior art is that the use of combustion catalysts based on platinum metals known for the purification of exhaust gases cause the residual content of ammonia to be predominantly or almost completely oxidized to $NO_x$.

It is the object of the present invention to provide a process for the removal of nitrogen oxides from the exhaust gas from turbines while at the same time obtaining a minimum residual content of ammonia in the purified gas.

DISCLOSURE OF THE INVENTION

The process of the invention is characterized in that the stream of gaseous ammonia needed for the catalytic reduction of the nitrogen oxides is added before the turbine at a temperature of the offgases of 400° C. to 1200° C. and a pressure of the offgases of 2 to 25 bar abs. By adding the gaseous ammonia before the turbine there is obtained a substantially homogenous mixture of the gas and the ammonia even if the latter is only introduced into the gas stream at one point, or for bigger plants at a few points.

It should be mentioned in this context that German patent application publication No. 37 21 051 A1 discusses and claims a process for the denitrification of flue gases by a selective reduction of nitrogen oxides in the presence of ammonia. According to this publication the ammonia is added to the flue gases by means of a suction device in which the flow velocity of the flue gas is increased in order to achieve an improved admixture of the ammonia into the flue gases. It is mentioned in the specification that the dosage of ammonia must be accurate in order to avoid an excess thereof in the flue gas. The flue gas and ammonia are intermixed in the suction device at 300° C. and are thereafter passed to a catalytic reactor in which the nitrogen oxides are reduced catalytically with ammonia to form nitrogen.

In contradistinction to this, ammonia according to the present invention may be added in excess and the addition takes place before a turbine at elevated temperatures (400° to 1200° C.) whereby a partial thermal decomposition of nitrogen oxides is obtained prior to the catalytic reduction in an SCR catalyst. The excess of ammonia is removed in a subsequent layer of a combustion catalyst.

According to the invention the gas to be passed to the turbine expediently comes from a combustion chamber at a temperature of 800° C. to 1200° C., preferably 900° C. to 1100° C., and a pressure of 5 to 25 bar abs., preferably 10 to 20 bar abs.

In another preferred embodiment the gas to be passed to the turbine comes from a piston engine at a temperature of 400° C. to 700° C., preferably 450° C. to 600° C., and a pressure of 2 to 6 bar abs., preferably 3 to 4 bar abs.

In a preferred embodiment of the process according to the invention there is added an excess of ammonia compared to that needed to reduce all of the $NO_x$ present in the gas; this ensures a high degree of de$NO_x$. It is advantageous according to the invention if the offgases after the turbine, if desired after a further cooling, are passed through a layer containing a catalyst for the selective catalytic reduction of $NO_x$ with $NH_3$ which is followed by a layer with a combustion catalyst. The combustion catalyst is characterized in that its components active in the combustion processes are metal oxides, preferably oxides of Cu, Mn and Cr, by virtue of which the residual content of $NH_3$ remaining in the gas after the reducing process is predominantly reduced to $N_2$. The active metal oxides are normally deposited on a carrier of, e.g., $Al_2O_3$, MgO and/or $SiO_2$.

DETAILED DESCRIPTION OF THE INVENTION

In the following the process according to the invention will be explained more detailed with reference to FIGS. 2 and 3 of the drawings.

Figure 3:
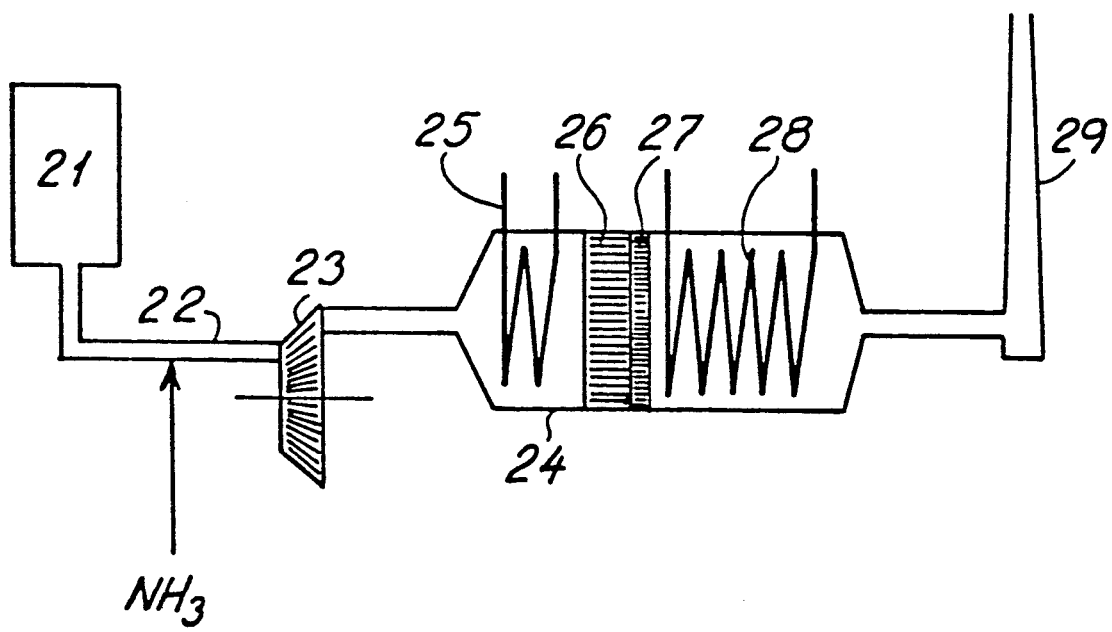

As shown in FIG. 3 gaseous ammonia is added to the offgases from an engine 21 at a point 22 before an exhaust turbine 23 in which the ammonia and the gas are blended homogenously. Here the pressure and temperature of the gas are typically 3 bar abs. and 500° C., respectively. During the passage through the turbine the gas is cooled at 400°-450° C. and the pressure drops at about 1 bar abs. The gas is passed to a boiler 24 and is cooled further at 340°-380° C. in a boiler section 25 before it passes into a layer of a $deNO_x$ SCR catalyst 26 and from there to a layer of a combustion catalyst 27 in which the $NH_3$ slip is burnt, predominantly to $N_2$.

The selectivity for the formation of $N_2$ is increased from 40% to 80% if the temperature is lowered from 350° C. to 250° C. before the combustion catalyst 27.

The SCR catalyst 26 followed by a layer of a combustion catalyst may if desired even be placed before the boiler 24. The two catalysts are mounted beside one another in a bed; this is advantageous from a constructional and operational point of view.

After the passage through the catalyst layers 26,27 the gas is cooled in a boiler section 28 before it is discharged to the atmosphere through a stack 29.

The cooling in the boiler section 25 may be omitted if after the turbine the gas has a temperature of 340°-380° C. suitable for the SCR catalyst, or if there is employed a SCR catalyst able to operate at higher temperatures, e.g. of 400°-450° C. suitable for the SCR catalyst, or if there is employed a SCR catalyst able to operate at higher temperatures, e.g. of 400°-450° C.

By the process according to the invention there is obtained up to 98-99% $deNO_x$ when the exhaust gas has a content of $NO_x$ of up to about 1800 ppm. The content of $NH_3$ in the purified gas is below a few ppm.

The combustion catalyst utilized in the process according to the invention contains as the active components metal oxides deposited on a carrier material of ceramic oxides such as aluminum oxide, magnesium oxide and silicon oxide or mixtures thereof. Such combustion catalysts and notably one containing copper oxide and manganese oxide in the atomic proportion 1:2 have been surprisingly found to have a great selectivity for the oxidation of $NH_3$ to form $N_2$ at temperatures of operation of 350°-450° C. and at the same time the latter has good activity for the combustion of CO and residual hydrocarbons in the gas.

If the gas contains sulphur oxides it is important that the residual content of $NH_3$ is very low, preferably below a few ppm, because otherwise there might be formed ammonium hydrogen sulphate which forms corrosive and insulating deposits on the boiler piping in boiler section 28. This is illustrated by the curves in FIG. 2.

Figure 2:
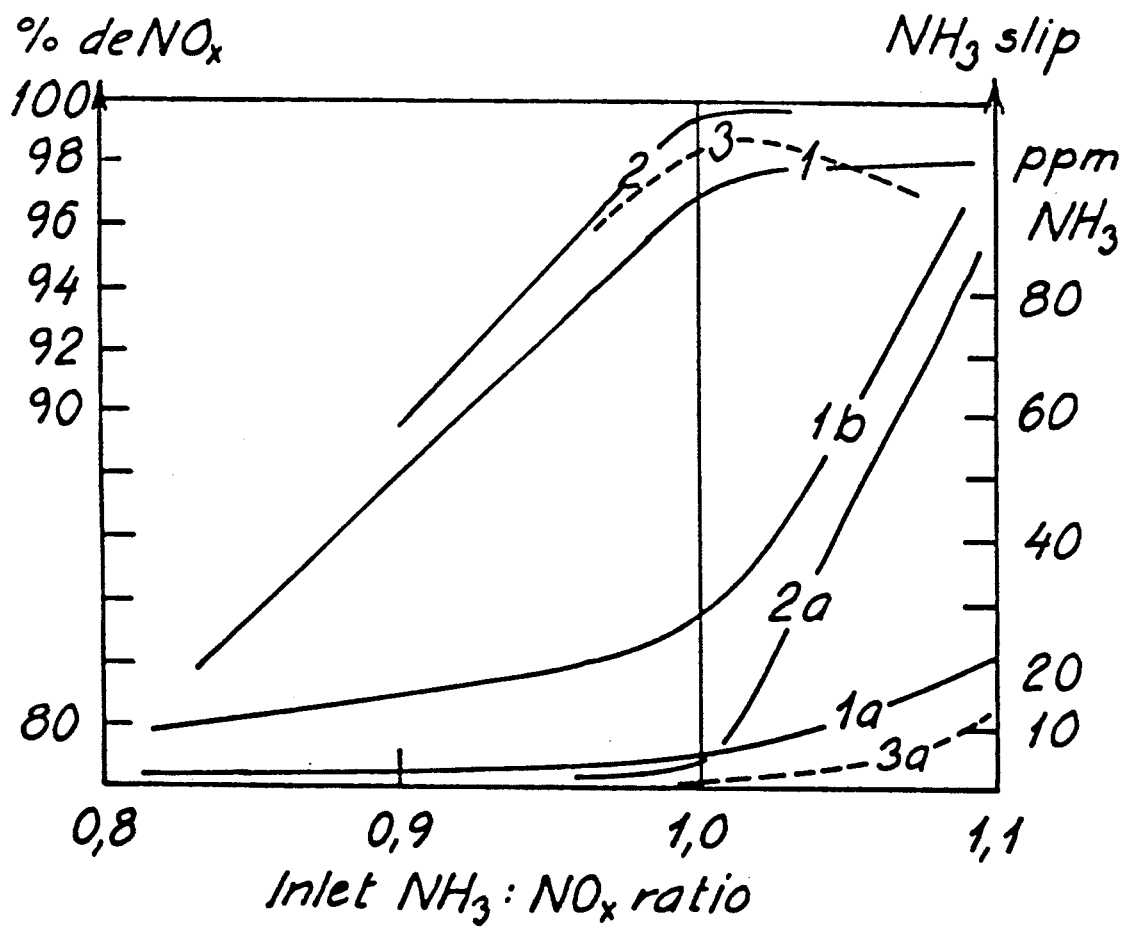
FIG. 2 shows the relationship between the $NH_3/NO_x$ proportion in the gas before the SCR catalyst, the obtained degree of de$NO_x$ and the $NH_3$ slip from the SCR catalyst layer, and FIG. 3 schematically illustrates the principle of the process according to the invention.

In FIG. 2 curves 1, 2 and 3 illustrate the variation in the degree of $deNO_x$, expressed in percent, and curves 1a, 1b, 2a and 3a the variation in the $NH_3$ slip, expressed in ppm, when changing the inlet ratio of $NH_3:NO_x$ from 0.8 to 1.1.

Curve 1 represents the degree of $deNO_x$ and curves 1a and 1b the $NH_3$ slip in a gas containing 200 ppm $NO_x$ and 1000 ppm $NO_x$, respectively, by means of a typical prior art monolithic SCR catalyst containing about 1% V on a carrier of $TiO_2$ at a space velocity of about 7000 $Nm^3/h$. The degree of conversion is almost independent of the $NO_x$ concentration whereas the ammonia slip is much bigger at 1000 ppm $NO_x$ (curve 1b) than at 200 ppm $NO_x$ (curve 1a). The proportion $NH_3:NO_x$ typically varies ±5-10% over the cross section of the flow and furthermore there is a factor of uncertainty of about ±5% because of delays in time and general measurement uncertainities in the adjustment of the proportion $NH_3:NO_2$; hereby the total degree of uncertainty is of the order of magnitude ±10%. This still makes it possible to obtain 90% $deNO_x$ at 200 ppm $NO_x$ and an $NH_3$-slip below 10 ppm (at a porportion $NH_3:NO_x$ of about 0.95) whereas it is not possible to obtain more than 80-85% $deNO_x$ at 1000 ppm $NO_x$ and the same $NH_3$-slip.

Curves 2 and 2a show the effect of increasing the volume of the same prior art catalyst by 50-100% at 1000 ppm $NO_x$, which may increase the degree of $deNO_x$ at 90% whereas a further increase of the catalyst volume can only increase the degree of purification by a few percent at the most. If the $NH_3$-slip must be kept below 3-5 ppm, which is the case when using sulphur-containing oils as fuel for Diesel engines, it is difficult to exceed a degree of $deNO_x$ of 80-85% at $NO_x$ concentrations of 100-1500 ppm which typically are present in discharge gases from Diesel engines.

Curves 3 and 3a in FIG. 2 show the degrees of $deNO_x$ and $NH_3$-slip obtained by using the process according to the invention when purifying an offgas from a Diesel engine containing 1800 ppm $NO_x$. There is employed an SCR catalyst based on $TiO_2$ with 1% of vanadium and a combustion catalyst with 18% of $CuO.Mn_2O_3$ on $Al_2O_3$ at a space velocity of 7,000 and 20,000 $Nm^3/h$, respectively, at temperatures of operation of 350°-400° C.; there is obtained 98% $deNO_x$ within a range of $NH_3:NO_x$ from 0.99 to 1.04 with $NH_3$-slips of a few ppm $NH_3$ or below and without the $NH_3$-slip causing inconveniences even if coming outside this range.

The process according to the invention will be illustrated by the following Examples.

EXAMPLE 1

Offgas, 50,000 $Nm^3/h$, from a four-stroke Diesel engine is purified in a plant as shown in FIG. 3. The offgas from the Diesel engine 21 is passed through exhaust turbine 23 and waste heat boiler 24 containing a panel of 10 $m^3$ of $deNO_x$ catalyst 26 and 4 $m^3$ of combustion catalyst 27. In this case the boiler does not contain any cooling section before the catalyst layers. The exhaust turbine is used for compressing the combustion air of the engine. The offgas contains 1500 ppm of nitrogen oxides ($NO_x$) and has a temperature of 450° C. and a pressure of 3 bars abs. before the exhaust turbine and 350° C. and 1 bar abs., respectively, after the exhaust turbine. Without the addition of $NH_3$ at point 22 no alteration of the $NO_x$ content takes place in the turbine.

When adding 1570 ppm of $NH_3$ to the gas in point 22 before the turbine the content of $NO_x$ is decreased from 1500 ppm measured before the turbine to 1450 ppm after the turbine and to 4 ppm $NO_x$ after the first catalyst layer 26, whereas after the second catalyst layer 20 ppm $NO_x$ is present in the gas, corresponding to a total removal of $NO_x$ of 99.7%. The content of $NH_3$ drops at 1450 ppm measured after the turbine, 30 ppm measured after the first catalyst layer and about 1 ppm $NH_3$ after the second catalyst layer. The combustion catalyst consists of 25% by weight of copper manganite ($CuO \cdot Mn_2O_3$) on an alumina carrier.

EXAMPLE 2

Flue gas in an amount of 200,000 $Nm^3/h$, at a temperature of 1050° C. and a pressure of 18 bar abs. is passed from a combustion chamber 21 (cf. FIG. 3) through gas turbine 23 and from there at a temperature of about 480° C. and a pressure of 1 bar abs. to boiler 24 which contains 40 $m^3$ of $deNO_x$ catalyst but no combustion catalyst. The gas is cooled at about 350° C. in cooling zone 25. The gas turbine drives an electric generator.

The flue gas contains 200 ppm $NO_x$ when no $NH_3$ is added to the gas. By the addition of 300 ppm $NH_3$ at point 22 before the turbine the contents of $NO_x$ and $NH_3$ are decreased at about 150 ppm $NO_x$ and about 150 ppm $NH_3$ after the turbine, and further at 8 ppm $NO_x$ and 5-10 ppm $NH_3$ after the catalyst panel 27.

INDUSTRIAL USE OF THE INVENTION

The invention is expected to be utilized in connection with at least large turbine plants and thereby contribute to reduce air pollution.

We claim:

1. A process for the removal of nitrogen oxides from offgases from turbines by a selective catalytic reduction with ammonia, and a selective catalyst characterized in that the stream of ammonia needed for the catalytic reduction of the nitrogen oxides is added to the total stream of offgases before the turbine and in the turbine homogenously mixed with the offgases at a temperature of the offgases of 400° C. to 1200° C. and a pressure of the offgases of 2 to 25 bar abs.

2. A process as claimed in claim 1, characterized in that the gas to be passed to the turbine comes from a combustion chamber at a temperature of 800° C. to 1200° C. and a pressure of 5 to 225 bar abs.

3. A process as claimed in claim 2, characterized in that the gas to be passed to the turbine comes from the combustion chamber at a temperature of 900° C. to 1100° C. and a pressure of 10 to 20 bar abs.

4. A process as claimed in claim 2, characterized in that the offgases after the turbine are passed through a layer of a catalyst for the selective catalytic reduction of nitrogen oxides with ammonia, followed by a layer containing a combustion catalyst.

5. A process as claimed in claim 1, characterized in that the gas to be passed to the turbine comes from a piston engine at a temperature of 400° C. to 700° C. and a pressure of 2 to 6 bar abs.

6. A process as claimed in claim 5, characterized in that the gas to be passed to the turbine comes from the piston engine at a temperature of 450° C. to 600° C. and a pressure of 3 to 4 bar abs.

7. A process as claimed in claim 5, characterized in that the offgases after the turbine are passed through a layer of a catalyst for the selective catalytic reduction of nitrogen oxides with ammonia, followed by a layer containing a combustion catalyst.

8. A process as claimed in claim 1, characterized in adding the gaseous ammonia in a stoichiometrical excess compared to the contents of nitrogen oxides in the offgases.

9. A process as claimed in claim 8, characterized in that the offgases after the turbine are passed through a layer of a catalyst for the selective catalytic reduction of nitrogen oxides with ammonia, followed by a layer containing a combustion catalyst.

10. A process as claimed in claim 1, characterized in that the offgases after the turbine are passed through a layer of a catalyst for the selective catalytic reduction of nitrogen oxides with ammonia, followed by a layer containing a combustion catalyst.

11. A process as claimed in claim 10, characterized in that the combustion catalyst consists of metal oxides deposited on a carrier selected from the group consisting of aluminium oxide, magnesium oxide, silicon oxide and mixtures thereof.

12. A process as claimed in claim 11, characterized in that the metal oxides are selected from the group consisting of copper oxide, manganese oxide and chromium oxide.

13. A process as claimed in claim 12, characterized in that the catalytically active material in the combustion catalyst consists of copper oxide and manganese oxide in the atomic proportion 1:2.

* * * * *